United States Patent
Shizukuishi (10) Patent No.: US 7,557,843 B2
(45) Date of Patent: Jul. 7, 2009

(54) SOLID STATE IMAGE PICKUP DEVICE WITH NON-VOLATILE MEMORY

(75) Inventor: Makoto Shizukuishi, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 676 days.

(21) Appl. No.: 10/628,237

(22) Filed: Jul. 29, 2003

(65) Prior Publication Data

US 2004/0021788 A1 Feb. 5, 2004

(30) Foreign Application Priority Data

Jul. 29, 2002 (JP) ............... 2002-219812

(51) Int. Cl.
H04N 3/14 (2006.01)
H04N 5/76 (2006.01)
G11C 8/00 (2006.01)
G11C 16/04 (2006.01)

(52) U.S. Cl. ............... 348/294; 348/231.99; 348/302; 365/230.06; 365/185.33

(58) Field of Classification Search ............ 348/231.99, 348/302; 365/230.06
See application file for complete search history.

(56) References Cited

U.S. PATENT DOCUMENTS 6,282,145 B1 * 8/2001 Tran et al. ............ 365/230.06
6,556,475 B2 * 4/2003 Yamazaki et al. ....... 365/185.23
6,563,187 B1 * 5/2003 Park ........................ 257/291
6,573,936 B2 * 6/2003 Morris et al. ............. 348/294
6,665,012 B1 * 12/2003 Yang et al. ................ 348/308
6,809,769 B1 * 10/2004 Yang ....................... 348/294
6,831,684 B1    12/2004 Ewedemi et al.
6,879,340 B1 *  4/2005 Chevallier ............... 348/231.9

FOREIGN PATENT DOCUMENTS

JP       11-331709   * 11/1999
JP       2002-165137   6/2002

* cited by examiner

Primary Examiner—Nhan T Tran
(74) Attorney, Agent, or Firm—Arent Fox LLP (57) ABSTRACT

A solid state image pickup device comprises: a semiconductor substrate defining a two-dimensional surface; a number of photoelectric conversion elements disposed in a light receiving area of the semiconductor substrate in a matrix shape and in a plurality of rows and columns; signal processors, each formed for each column of the photoelectric conversion elements, the signal processor at least converting analog image data from the photoelectric conversion elements into digital image data; and a non-volatile memory formed in correspondence with respective photoelectric conversion elements at a succeeding stage of the signal processor, the non-volatile memory recording the digital image data.

18 Claims, 9 Drawing Sheets

MTa

FIG. 7B

MTa

FIG. 7C

MTb

FIG. 7D

MTb

FIG. 7E

MTc

FIG. 7F

MTc

SOLID STATE IMAGE PICKUP DEVICE WITH NON-VOLATILE MEMORY

CROSS REFERENCE TO RELATED APPLICATION

This application is based on and claims priority of Japanese Patent Application No. 2002-219812 filed on Jul. 29, 2002, the entire contents of which are incorporated herein by reference.

BACKGROUND OF THE INVENTION

A) Field of the Invention

The present invention relates to a solid state image pickup device, and more particularly to a solid state image pickup device in which signal charges are accumulated in a number of photodiodes formed on a semiconductor substrate and read to output an image signal.

B) Description of the Related Art

Figure 9:
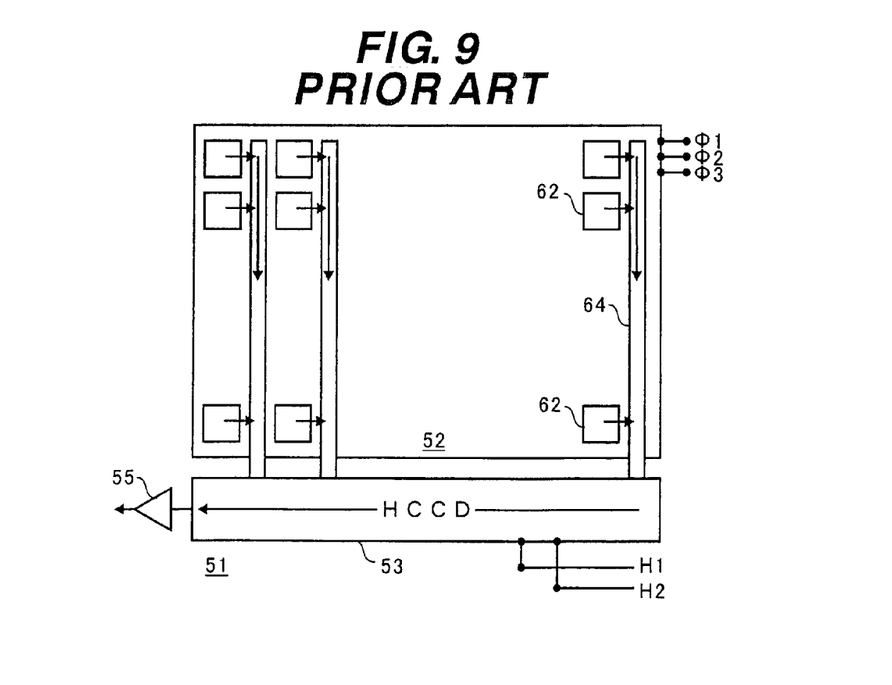
FIG. 9 is a block diagram showing the structure of a conventional general charge coupled device (CCD) type solid state image pickup device 51 of a three-phase drive (φ1 to φ3) type.

FIG. 9 is a block diagram showing the structure of a charge coupled device (CCD) type solid state image pickup device 51 of a known three-phase drive type ($\phi1$ to $\phi3$).

The solid state image pickup device 51 has a number of photodiodes 62 disposed in a square lattice shape in a light receiving area (image area) 52 and a CCD type vertical charge transfer path (VCCD) 64 disposed for each photodiode column. VCCD 64 has three polysilicon layers and provides three polysilicon electrodes for each photodiode (photodiode row).

Along one side of the light receiving area 52, a CCD type horizontal charge transfer path (HCCD) 53 is disposed and connected to one ends of VCCDs 64. At the succeeding stage of HCCD 53, an output amplifier 55 is connected which is made of a high speed analog amplifier.

Signal charges accumulated in the photodiodes 62 are read to VCCDs 64 at the same time and thereafter sequentially transferred along a vertical direction in VCCDs 64 by a three-phase drive method using drive signals $\phi1$, $\phi2$ and $\phi3$. The signal charges for each row transferred in VCCDs 64 are transferred to HCCD 53. The signal charges in HCCD 53 are transferred along a horizontal direction by a two-phase drive method using drive signals H1 and H2 and the charges for each pixel are transferred to the output amplifier 55.

The output amplifier 55 is made of, for example, a charge/voltage (Q/V) converter unit comprising a floating diffusion amplifier (FDA) and a source follower circuit. An image signal amplified by the output amplifier 55 is output to an external analog signal processing circuit. A horizontal read clock is generally 14 MHz or higher. Higher drive is requested because of a higher density of pixels.

Figure 10:
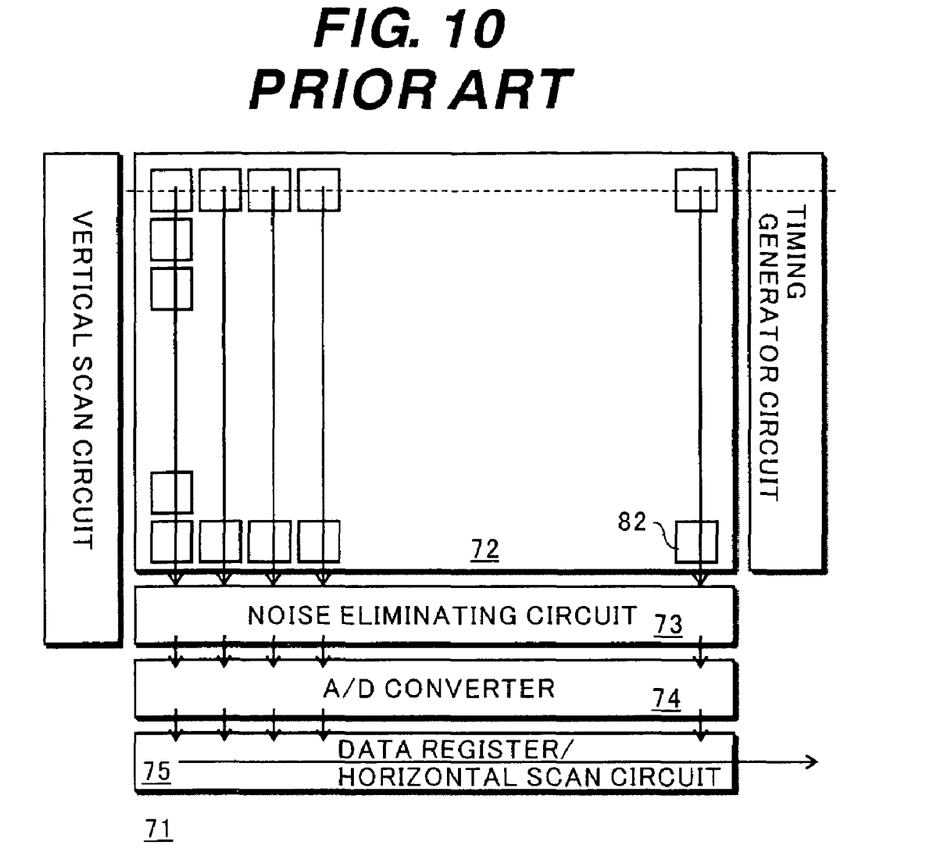
FIG. 10 is a block diagram showing the structure of a conventional general MOS type solid state image pickup device.

FIG. 10 is a block diagram showing the structure of a known MOS type solid state image pickup device. The MOS type solid state image pickup device 71 has: a light receiving area 72 in which a number of pixels 82 are disposed, each pixel including a photodiode and a charge read circuit for reading charges from the photodiode; a noise eliminating circuit (sample/hold circuit) 73 provided for each column of the pixels 82; an A/D converter circuit (comparator, data latch) 74 provided for each pixel column; a horizontal read circuit 75 including a data register and a horizontal scan circuit used in common by respective columns; and the like.

Charges accumulated in each pixel are read by the charge read circuit and supplied to the noise eliminating circuit 73 and A/D converter 74 via a wiring line to be converted into a digital signal. The digital signals for each row are serially read to an external by the horizontal read circuit 75. If a mechanical shutter does not exist, it is necessary to read an image signal from the image pickup device to the external as fast as possible in order to prevent unnecessary optical signals or dark current from mixing with the image signal. A horizontal read clock is generally 14 MHz or higher. Higher drive is requested because of a higher density of pixels.

When one frame (one full screen image or a partial area of the one full screen image) is taken with a solid state image pickup device, it is necessary to read signals of all pixels from the solid state image pickup device in a limited period of time. It is therefore inevitable to drive the solid state image pickup device at high speed, resulting in an increase of noises and a consumption power.

If a MOS type solid state image pickup device is used, an electronic shutter function is difficult to be realized. If a subject moves in the predetermine period of time taken to read all pixel data, the image flows. Although the motion of a subject can be suppressed small by reading all pixel data at high speed, the exposure time becomes short, which may lower the exposure amount. Also, the operation speed of the horizontal read circuit becomes high and a consumption power increases.

SUMMARY OF THE INVENTION

An object of this invention is to provide a solid state image pickup device of a low consumption power and low noises.

Another object of the invention is to provide a solid state image pickup device which is not necessary to use a DRAM and an external analog/digital converter and is able to realize reduction of a system cost.

Still another object of the invention is to provide a MOS type solid state image pickup device of a low consumption power capable of high speed imaging.

According to one aspect of the present invention, there is provided a solid state image pickup device comprising: a semiconductor substrate defining a two-dimensional surface; a number of photoelectric conversion elements disposed in a light receiving area of the semiconductor substrate in a matrix shape and in a plurality of rows and columns; signal processors, each formed for each column of the photoelectric conversion elements in an area of the semiconductor substrate other than the light receiving area, the signal processor at least converting analog image data from the photoelectric conversion elements into digital image data; and a non-volatile memory formed in correspondence with respective photoelectric conversion elements in an area of the semiconductor substrate other than the light receiving area at a succeeding stage of the signal processor, the non-volatile memory recording the digital image.

It is possible to provide a solid state image pickup device of a low consumption power and low noises.

It is also possible to provide a solid state image pickup device which is not necessary to use a DRAM and an external analog/digital converter and is able to realize reduction of a system cost.

It is also possible to provide a MOS type solid state image pickup device capable of high speed imaging and an electronic shutter function.

DESCRIPTION OF THE PREFERRED EMBODIMENTS

Figure 1:
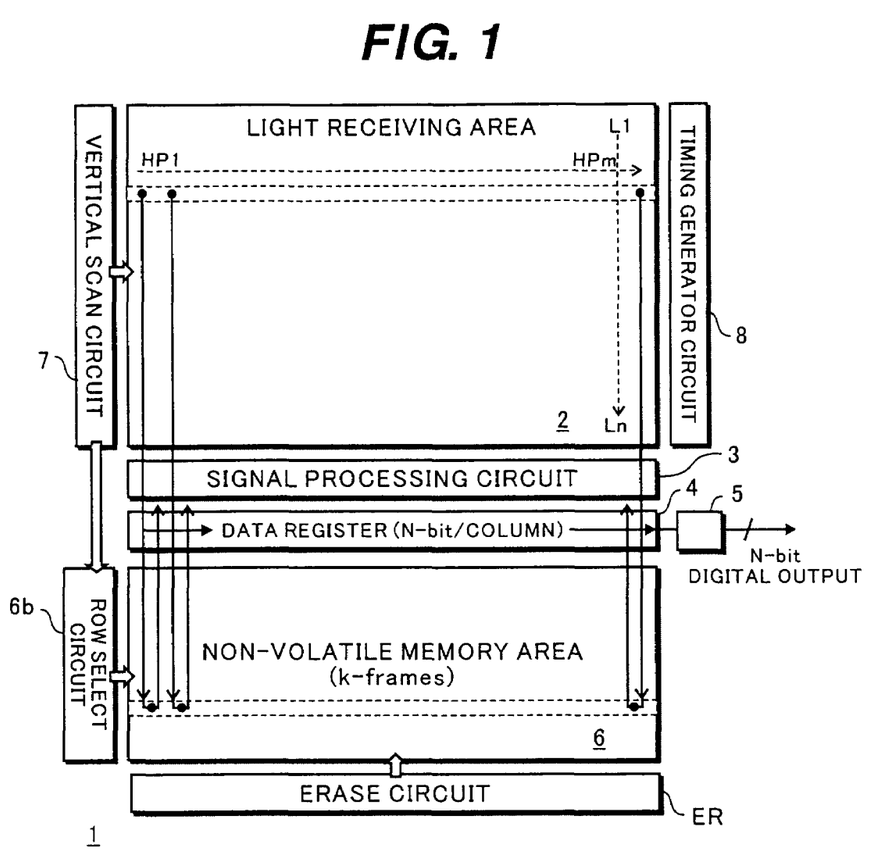
FIG. 1 is a block diagram showing the structure of a solid state image pickup device 1 according to an embodiment of the invention.

FIG. 1 is a block diagram showing the structure of a solid state image pickup device 1 according to an embodiment of the invention.

The solid state image pickup device 1 has: a light receiving area 2 for receiving image information; a signal processing circuit 3 including an A/D converter circuit for converting an analog signal into an N-bit digital signal; a data register 4 having a depth of N bits; and a non-volatile memory area 6 in which N-bit digital image signals of k-frames are recorded. In this specification, the term "frame" is intended to mean one full screen image or some area in one full screen image. A number of photoelectric conversion elements disposed in a matrix shape having m columns (HP1 to HPm) and n rows (L1 to Ln) and a mechanism for transferring signals corresponding to charges read from the photoelectric conversion elements of each column along the column direction are formed in the light receiving area 2. The light receiving area 2 may be either of a CCD type or of a MOS type. The signal transfer mechanism is VCCD in the case of the CCD type in which read charges themselves are transferred. In the case of the MOS type, a charge read MOS circuit is connected to each photoelectric conversion element (photodiode) and a voltage or current signal corresponding to the readout charges is transferred along the column direction over a wiring line. This charge read-out circuit and wiring line constitutes the signal transfer mechanism.

A vertical scan circuit 7 and a timing generator circuit 8 are disposed near the light receiving area 2 so that a desired row in the light receiving area can be selected and a signal corresponding to accumulated charges can be output. The light receiving area 2 can output in parallel the analog image signals at the respective columns of a selected row.

The signal processing circuit 3 provided for each pixel column of the light receiving area 2 converts an analog signal at each column received from the light receiving area 2 into an N-bit digital signal. N-bit digital signals output in parallel from the signal processing circuits 3 are temporarily stored in the data register 4 having a depth of N bits. The signal processing circuit 3 is made of, for example, a metal oxide semiconductor (MOS) transistor circuit formed outside of the light receiving area 2. Each signal processing circuit 3 includes at least a noise eliminating circuit, an analog/digital converter (ADC) and the like. The details of the signal processing circuit 3 will be given later with reference to FIGS. 4 and 5.

Digital signals corresponding to the image signals at each row and stored in the data register 4 are thereafter stored in the non-volatile memory 6. Digital image data can be stored in the non-volatile memory area 6 at rows and columns corresponding to those of the light receiving area 2, by synchronizing the operations of the vertical scan circuit 7 and a row selection circuit 6b.

The data register (buffer memory) 4 is made of, for example, SRAMs or the like. The data register 4 has a depth of N bits (e.g., 10 bits) and disposed as an array of each pixel. The number of arrays of the data register 4 is equal to the horizontal pixel number (m) of the light receiving area 2. The non-volatile memory area 6 has N×m bits per one pixel row in correspondence with the data register 4. Namely, analog signals of one pixel row in the light receiving area 2 are processed (A/D converted) for respective pixels to obtain parallel digital data of N×m bits which are stored in parallel via the data register 4 into the memory cells corresponding to one row in the non-volatile area 6.

The data register 4 is used as a data register (buffer memory) for read/write of the non-volatile memory area 6. During the read operation, the data register 4 can be used as a horizontal transfer path of an image signal.

The non-volatile memory area 6 is disposed as an array of each pixel and has a horizontal width of bits corresponding to the horizontal pixel number (m) of the light receiving area 2 and a depth of N bits (e.g., 10 bits) per pixel.

The non-volatile memory area 6 has a capacity capable of storing all pixel signals of one or more frames (full screen images), and is made of a semiconductor non-volatile memory such as a flash memory. The memory space (memory capacity) of one frame is the number of bits (N bits) per pixel×the horizontal pixel number (m)×the vertical pixel number (n) of the light receiving area 2. Therefore, the non-volatile memory area 6 has a memory space of the number of bits (N bits) per pixel×the horizontal pixel number (m)×the row number (n) of the light receiving area 2×a frame number (k).

A digital output circuit 5 reads digital data read from the non-volatile memory area 6 and stored in the data register 4 and transfers the read data along the horizontal direction to output it to an external of the solid state image pickup device 1. The digital data of N bits (e.g., 10 bits) per one pixel may be output in parallel.

The non-volatile memory area 6 is made of, for example, NAND type EE-PROMs, NOR type flash EE-PROMs or the like. The structure of each memory transistor may be a floating gate type non-volatile memory cell, a MONOS type non-volatile memory cell, a ferroelectric memory cell or the like. These memories will be later described in detail.

A flash memory of 100 bits can be formed in the size of one pixel, assuming that NAND type EE-PROM minimum size F (design rule) is 0.15 μm, a flash memory cell size is $4F^2$ and a pixel size is 3×3 μm square. If 10 bits are allocated to one pixel, the unit memory cell area used for storing data of one pixel is a tenth of the area of one pixel. The area of the non-volatile memory area 6 used for recording data of one frame (all pixels) is therefore about a tenth of the area of the light receiving area 2.

A flash memory (non-volatile memory area 6) having approximately the same area as that of the light receiving area 2 can record images of ten frames. A practical lower limit of the size of a pixel used with a digital camera or the like is considered about 2×2 μm square because of the restrictions of a lens resolution and a wavelength of visual light. Such restrictions are not applied to a memory so that high integration and an increased number of record frames are considered to be realized by incorporating fine micro patterning and/or multi-level memory cell techniques.

In the non-volatile memory area 6, ferroelectric memories (FeRAM: registered trademark) may be used. A memory write time can be shortened to 100 ns/byte or shorter. Since an erase sequence is not necessary (since overwrite is possible), the time taken to transit to the next imaging operation can be shortened.

The vertical scan circuit 7 can designate a row of the light receiving area 2 by using an address (Y), and at the same time the address (Y) of the corresponding memory cells of the non-volatile memory area 6 can be designated. Each memory cell of the non-volatile memory area 6 has a depth of N bits (e.g., 10 bits).

The non-volatile memory area 6 has memory cells in the horizontal direction same in number as the horizontal pixel number (m) of the light receiving area 2, and is one-to-one correspondence with horizontal pixel numbers HP1 to HPm. The address (X) in the horizontal direction is therefore unnecessary to be designated.

Digital image signals of the respective columns are output parallel, A/D converted and stored in the non-volatile memory. It is possible to read/write image data at high speed without speeding up a circuit operation. Image data stored in a non-volatile memory is not erased even if the power is turned off and can be read at any time. The read speed of image data once written is not dependent upon the write speed.

The row select circuit 6b is formed near the non-volatile memory area 6. The row select circuit 6b selects a row of the non-volatile memory area 6, and the digital image signals at the selected row are read and stored in the data register 4. Each digital image signal is N-bit data. Digital data of one frame can be stored in the data register by sequentially selecting rows and reading digital data of pixels.

The circuit elements described above can be integrated on the same semiconductor substrate on which the solid state image pickup device 1 is formed. Since digital image signals are output, an external analog/digital converter circuit is not necessary.

In this embodiment, as will be later described, prior to reading digital image signals to an external, the digital image signals of one frame are directly recorded in the non-volatile image area 6. After the imaging capturing is completed the digital image signals recorded in the non-volatile memory area 6 are read. The read speed (clocks) of reading the recorded digital image signals to an external is optional (may be a low speed). By lowering the read speed, a consumption power can be reduced. It is preferable to erase the digital image signals in the non-volatile memory area 6 by using an erase circuit ER before the next imaging operation.

Next, a flow of an image signal of this embodiment will be described with reference to the flow chart shown in FIGS. 2A and 2B.

Figure 2A:
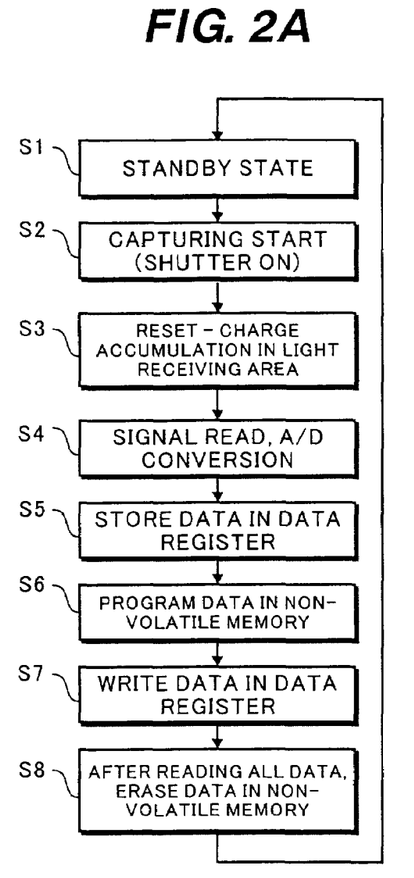
FIG. 2 is a flow chart illustrating an image signal flow according to the embodiment.

FIG. 2A illustrates the case wherein the non-volatile memory area 6 of the solid state image pickup device 1 of the embodiment has a capacity of one frame.

After a standby state at Step S1, an imaging operation starts in response to a shutter trigger event at Step S2.

At Step S3, signal charges that has been accumulated in the light receiving area 2 are once reset to perform the new imaging operation to thereafter accumulate signal charges in the light receiving area 2.

At Step S4, analog signal charges accumulated in the light receiving area 2 are read via the vertical transfer paths in the case of the CCD type, or via the signal read circuit and wiring lines in the case of the MOS type. The read analog signal charges at each column are subjected to noise elimination and signal processing such as A/D conversion by the signal processing circuit 3 to thereby obtain digital image signals.

At Step S5, the digital image signals of one row processed parallel by the signal processing circuit 3 are stored in the data register 4.

At Step S6, the digital image signals stored in the data register 4 are programmed (stored) in the corresponding area of the non-volatile area 6. At this stage, the programmed digital image signals may be verified.

The processes at Steps S4 to S6 are repeated for each of the pixel rows L1 to Ln of the light receiving area 2 to program the image signals of all pixels in one frame in the non-volatile image area 6.

If data of all pixels is to be recorded in the non-volatile memory area 6 in 1/100 sec and there are 1000 rows (n=1000), a process time per one row is 10 μsec. The write time of the non-volatile memory area is therefore required to be 10 μsec or shorter at the longest.

In this embodiment, the time taken to transfer data to the buffer memory is negligible short and since the digital pixel signals of the horizontal pixel number are recorded parallel in the non-volatile memory area corresponding to the horizontal pixel row, the data write (program) time of one pixel row corresponds to the write time of data (10 bits in this embodiment) of each pixel. A most recent flash memory capable of high speed write has a write speed of about 5 μsec/byte or shorter. It is therefore possible to ensure the write time of the non-volatile memory area, even if the time taken to perform pixel signal processing, A/D conversion and the like are taken into consideration. The imaging operation and the data write can therefore be completed in the above-described time (in real time).

At Step S7, the digital image signals programmed in the non-volatile memory area 6 are read into the data register 4 and output to the external of the solid state image pickup device 1 by the digital output circuit 5. After the signals are output to the external, signal processing, data compression and the like are further executed.

Since data of all pixels in the light receiving area 2 is stored in a non-volatile manner in the non-volatile memory area 6, the data read at Step S7 is not necessary to be performed in real time nor it is necessary to supply electric power to maintain data. Namely, even if the power is turned on, the data can be read when the power is turned on.

At Step S8, the digital image signals in the non-volatile image area 6 are erased to prepare for the next imaging. The image data other than the management data is erased collectively so that the time necessary for the next imaging can be shortened. Thereafter, the standby state at Step S1 resumes.

Figure 2B:
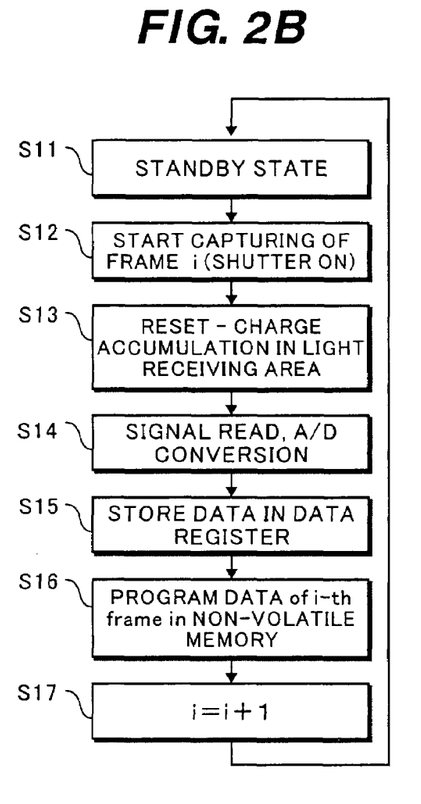

FIG. 2B illustrates the case wherein the non-volatile memory area 6 of the solid state image pickup device 1 of the embodiment has a capacity of a plurality of frames.

After a standby state at Step S11, an imaging operation for the i-th frame starts in response to a shutter trigger event at Step S12.

At Step S13, signal charges having been accumulated in the light receiving area 2 are once reset to perform the new imaging operation and accumulate signal charges in the light receiving area 2.

The processes at Steps S14 and S15 are nearly the same as those described with reference to FIG. 2A, and the description thereof is omitted.

At Step S16, the digital image signals of the i-the frame stored in the data register 4 are programmed in the area of the non-volatile memory area corresponding to the i-th frame. At this time, the programmed digital image signals may be verified.

The processes at Steps S14 to S16 are repeated for each of the pixel rows L1 to Ln of the light receiving area 2. The image signals of all pixels of the i-th frame can thus be programmed in the area of the non-volatile memory area 6 corresponding to the i-th frame.

At Step S17, the present frame number (i) is incremented by 1. The processes at Steps S11 to S16 can be repeated until the number of present frames becomes larger than the number (k) of frames programmable in the non-volatile memory area 6.

A user can output the image signals of a desired frame programmed in the non-volatile memory area 6 to an external via the data register 4 at any time desired. A user can erase the image signals of a desired frame programmed in the non-volatile memory area 6. The image signals of all frames may be erased at a time.

Next, with reference to FIG. 3, the description will be made on the structure of the light receiving area 2 of the solid state image pickup device 1 of the CCD type according to the embodiment of the invention.

The light receiving area 2 has a number of photoelectric conversion elements 12 (including n-type impurity doped regions 12*a* and buried p+-type impurity doped regions 12*b*) disposed in a so-called pixel shift layout. The "pixel shift layout" used in this specification is the layout of a combination of first lattices of a two-dimensional tetragonal matrix and second lattices of a two-dimensional tetragonal matrix having lattice points between the first lattices. For example, each photoelectric conversion element 12 in the even number column (row) is shifted in the column (row) direction by about a half pitch of photoelectric conversion elements 12 in the column (row) direction from each photoelectric conversion element 12 in the odd number column (row), and each photoelectric conversion element column (row) contains only photoelectric conversion elements 12 of the odd row (column) or even row (column). The "pixel shift layout" is one of the layouts wherein a number of photoelectric conversion elements 12 are disposed in a plurality of rows and columns and in a matrix shape.

The phrase "about a half pitch of photoelectric conversion elements in the column (row) direction" is intended to include also the pitch regarded as substantially equal to the half pitch from the performance and image quality although this pitch is different from the correct half pitch because of manufacture tolerances, rounding errors of pixel positions to be caused by design or mask manufacture, or the like.

An n-type transfer channel region (vertical transfer channel) 14 is formed between adjacent columns of photoelectric conversion elements 12 along the vertical direction in a zigzag way. The n-type transfer channel region 14 reads signal charges generated in the photoelectric conversion elements 12 and transfers them in the vertical direction. The transfer channels are disposed in the zigzag way in the gaps formed by the pixel shift layout. The adjacent transfer channels are spaced apart from each other by the photoelectric conversion elements and are made near each other via a channel stop region 13.

Most of the area of the semiconductor substrate in the light receiving area are occupied effectively by the photoelectric conversion elements and transfer channels.

Transfer electrodes 16*a* are formed above the vertical transfer channel region 14 with an insulating film (not shown) being interposed therebetween. The transfer electrode is formed in a zigzag way along the horizontal direction in the gap between the photoelectric conversion elements 12. Two electrodes per one row are formed, and on pixel per two rows is disposed for each column. Therefore, there are four electrodes per pixel. Almost all the area of the transfer electrodes is disposed above the transfer channel regions.

The transfer electrode 16*a* together with the vertical transfer channel region 14 constitutes a vertical charge transfer path (VCCD) and transfers signal charges generated in the photoelectric conversion elements 12 in the vertical direction by using four-phase drive pulses ($\phi 1$ to $\phi 4$). Each of the transfer electrodes 16*a* driven at a different phase is made of a single layer electrode formed on the same flat plane and spaced apart by a narrow gap (gap between the transfer electrodes 16*a* in the extension direction).

The "single electrode (structure)" used in this embodiment is different from a conventional so-called multilayer polysilicon electrode (structure). A plurality of electrodes are disposed on the same flat plane at a narrow gap without any overlap. In this specification, therefore, the single electrode structure includes not only a structure made of single conductive material (e.g., impurity doped poly-silicon (Si), tungsten (W) and the like, but also a structure made of compound such as tungsten silicide, and compound of polysilicon and tungsten, a lamination structure, and the like.

For the details of the structure and manufacture method for a solid state image pickup device having the single electrode structure, refer to the detailed description of the embodiments in the Publication of Japanese Patent Application No. 2000-383922 submitted on Dec. 18, 2000 by the assignee of the present applicant. For example, a single layer electrode film is formed and patterned to form separate electrodes. Thereafter, a thin conductive layer is deposited and anisotropically etched to leave the conductive layer on the side walls of each electrode to narrow the gap between the electrodes. The electrode layer may be made of impurity doped poly-silicon or metal. The conductive layer to be deposited later may be metal or poly-silicon if it can be grown by CVD.

Figure 3:
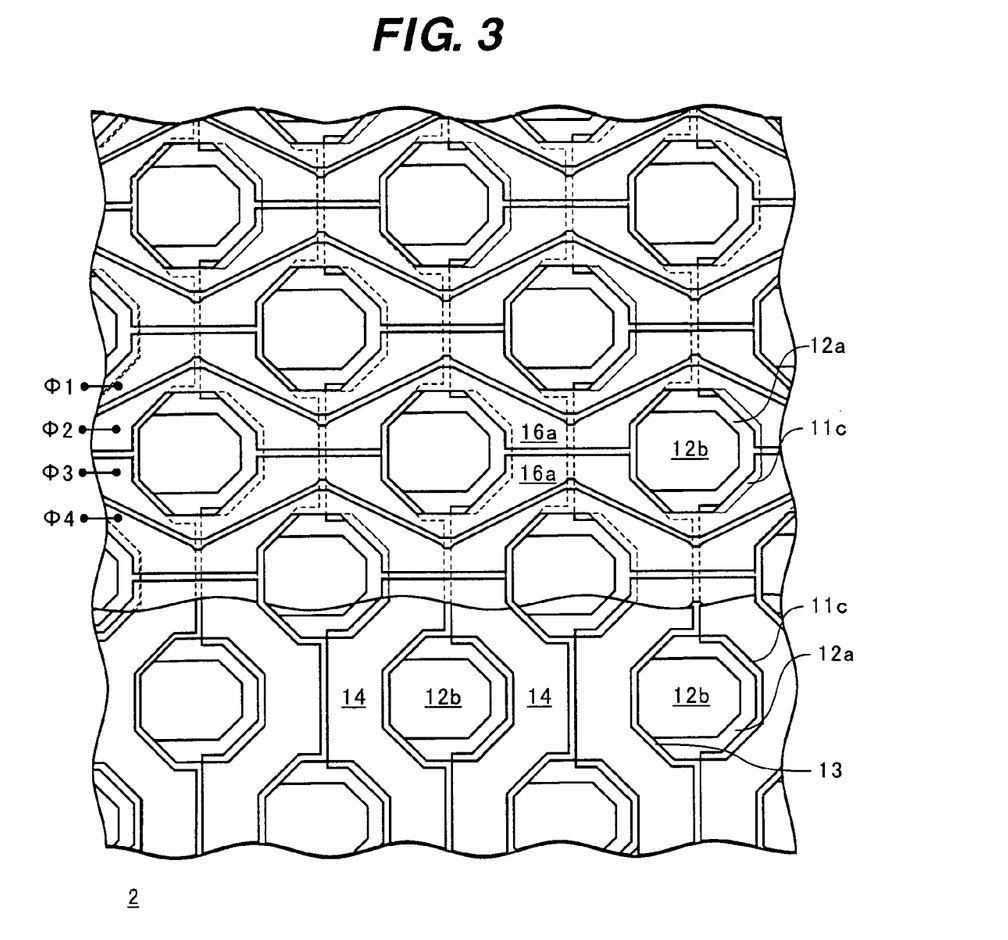
FIG. 3 is a plan view of a light receiving area 2 of the solid state image pickup device 1 of the embodiment.
Figure 4:
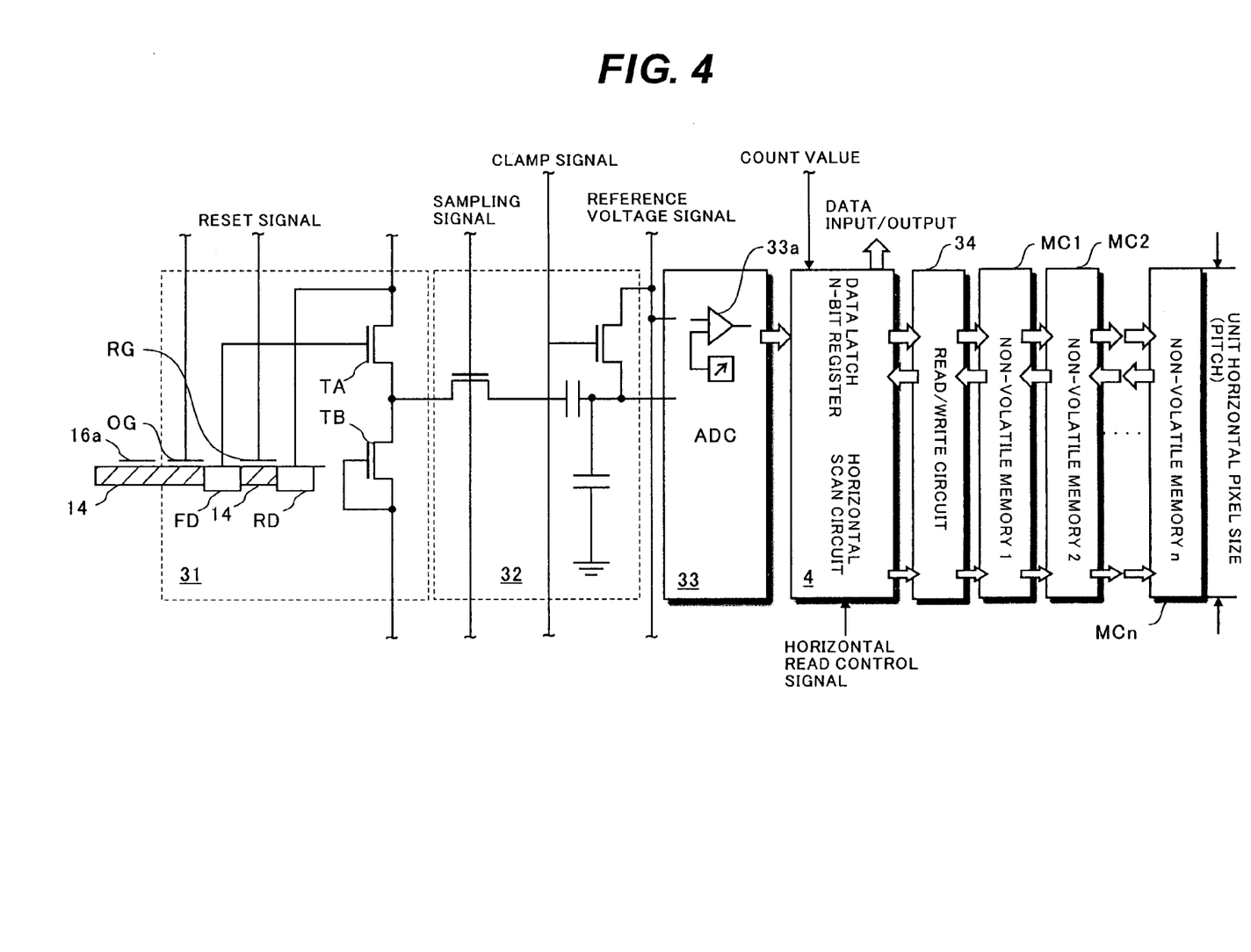
FIG. 4 is a block diagram showing an example of the structure of a peripheral circuit including a signal processing circuit 3 and a non-volatile memory area 6 according to the embodiment of the invention.

FIG. 4 shows the structure of an output end of each VCCD having the structure shown in FIG. 3 and succeeding circuit portions. Elements having the identical reference numbers to those shown in FIGS. 1 and 3 are substantially the same elements.

The signal processing circuit 3 is provided for each column of the light receiving area 2, corresponding to each vertical transfer channel 14. The width of each signal processing circuit 3 is equal to or smaller than the horizontal pitch (unit horizontal pixel size) of each photoelectric conversion element 12. For example, in the area of this unit horizontal pixel pitch, an amplifier circuit (FDA) 31, a noise eliminating circuit 32, an analog/digital converter (ADC) 33 including a comparator circuit 33*a* and the data latch (data register) 4 are formed on the chip.

FDA 31 is a charge/voltage (Q/V) conversion circuit constituted of a floating diffusion amplifier (FDA) and a source follower circuit and converts signal charges supplied from the vertical transfer channel 14 of the light receiving area 2 into an analog voltage signal.

An output gate OG is formed adjacent to the transfer gate 16a at the end of the vertical transfer channel 14. An n-type floating diffusion area FD is formed adjacent to the vertical transfer channel 14. An n-type region 14 is formed adjacent to the floating diffusion FD, and a reset gate RG is formed above the n-type region 14. A reset signal is applied to the reset gate RG. As a negative voltage is applied to the output gate OG and reset gate RG to deplete the n-type regions so that the floating diffusion FD takes an electrically floating state.

The floating diffusion FD is connected to the gate of an output MOS transistor TA. A reset drain RD is connected to the drain of the transistor TA. The source of the transistor TA is connected to the drain of a load MOS transistor TB.

The load MOS transistor TB functions as a load resistor by connecting together the gate and source so that a source follower is formed with the transistor TA.

FDA 31 with the above-described circuit structure converts signal charges supplied from the vertical transfer channel 14 of the light receiving area 2 into an analog voltage signal proportional to the signal charge amount and supplies the analog voltage signal to the next stage noise eliminating circuit 32.

The noise eliminating circuit 32 is made of, for example, a correlation double sampling circuit and has the structure shown in FIG. 4. The noise eliminating circuit 32 charges a capacitor with a reference voltage supplied at the timing when a clamp signal is supplied, and clamps a field through level of a supplied analog voltage signal. A difference between the sampled analog voltage signal and the clamped field through level is supplied to the comparator circuit 33a. 1/f noises and reset noises can be reduced by passing the analog voltage signal through the noise eliminating circuit 32.

The comparator circuit 33a together with the data latch (data register) 4 constitutes ADC 33 which converts the supplied analog voltage signal into a digital image signal. The comparator circuit 33a compares the analog voltage signal supplied from the noise eliminating circuit 32 with the reference voltage to detect a zero level at which a difference between both the signals is zero. When the comparator circuit 33a detects the zero level, it outputs a latch signal to the data latch 4. A count value is supplied to the data latch 4. The count value increases its value after the reference voltage signal starts changing, and is proportional to the analog voltage signal. Namely, the count value when the zero level is detected represents digital data corresponding to the supplied analog voltage signal.

A digital image signal converted by ADC 33 is read from the data latch 4 by a read/write circuit 34 and stored in one of non-volatile memories MC1 to MCn corresponding to the read row of the light receiving area 2. For example, a signal for the row L1 of the light receiving area 2 is stored in the non-volatile memory MC1. This store operation is performed for all rows (L1 to Ln) of the light receiving area 2 to store signals for all pixels in the non-volatile memories MC1 to MCn. The non-volatile memories MC1 to MCn can store digital image signals of one frame. If digital image signals of a plurality of frames are to be stored, a plurality set of non-volatile memories MC1 to MCn (non-volatile memories MC1 to MCn×frame number k) are prepared.

The stored digital image signals are read sequentially one row after another by the read/write circuit 34 and output to the data register (horizontal scan circuit) 4.

In this embodiment, all pixels in each row are processed parallel and written parallel. Reading data in the non-volatile memory area 6 may be performed at a low read frequency because data is not lost nor influence of noises is susceptible. Real time recording of non-compressed pixel signal data, which has not been realized to date, is possible and low consumption power drive is also possible.

Figure 5:
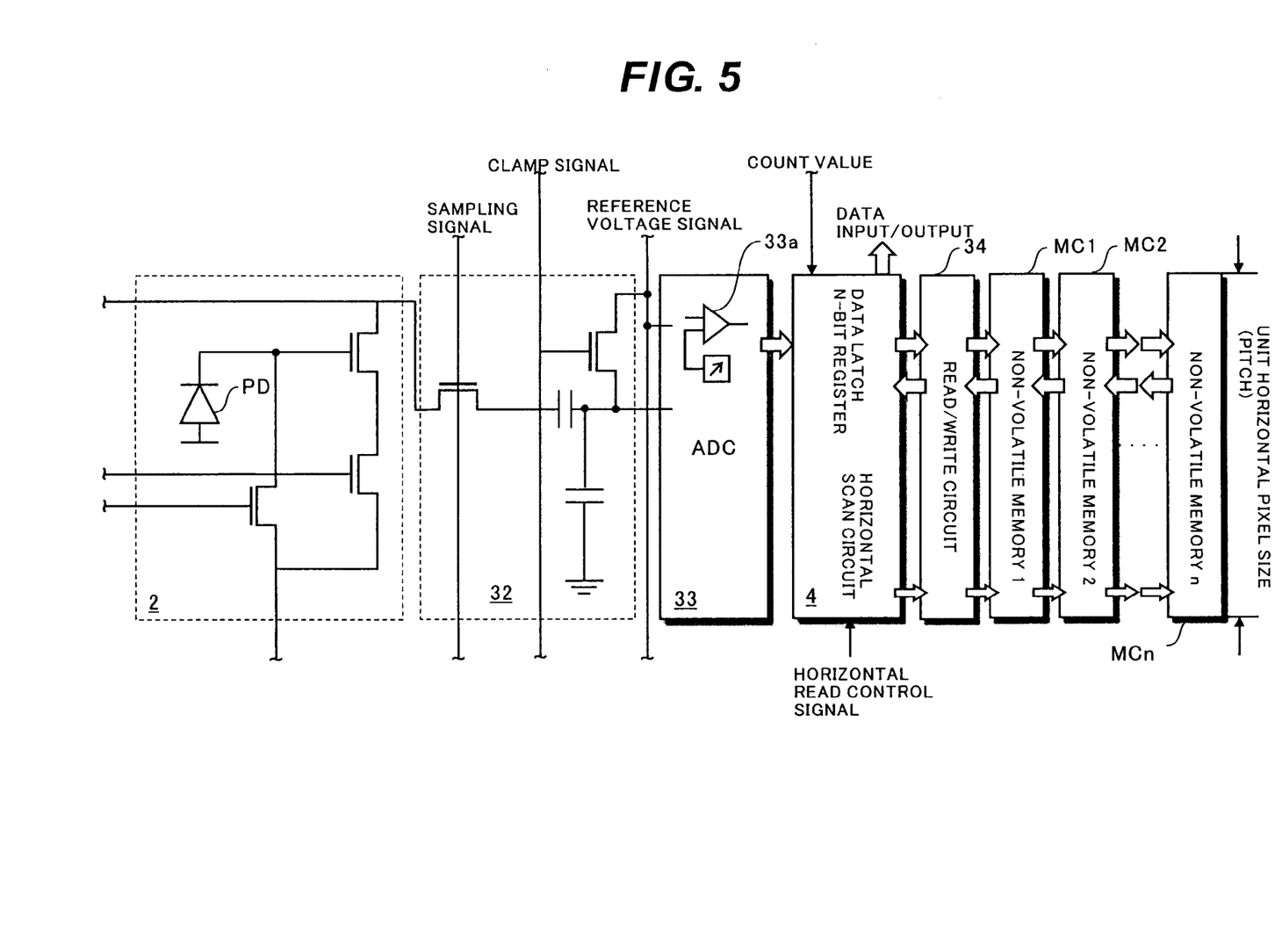
FIG. 5 is a block diagram showing another example of the structure of a peripheral circuit including a signal processing circuit 3 and a non-volatile memory area 6 according to the embodiment of the invention.

FIG. 5 is a block diagram showing another example of the structure of the peripheral circuit including the signal processing circuit 3 and non-volatile memory area 6 according to the embodiment of the invention. Elements having the identical reference numbers to those shown in FIGS. 1, 3 and 4 are substantially the same elements. FIG. 5 shows the peripheral circuit when the light receiving area 2 is of the MOS type.

As different from the CCD type, in the light receiving area 2 of the MOS type, a voltage signal of a photodiode PD at each pixel is amplified by a read circuit. FDA 31 (FIG. 4) is therefore unnecessary. The other structure is the same as that of the CCD type shown in FIG. 4 and the description thereof is omitted.

Next, with reference to FIGS. 6A to 6C and FIGS. 7A to 7F, the structure of a non-volatile memory constituting the non-volatile memory area 6 will be described. If the data length of a digital image signal after A/D conversion by the signal processing circuit 3 (FIG. 1) is N bits, the non-volatile memory having a width of N bits is used as a memory array.

Figure 6A:
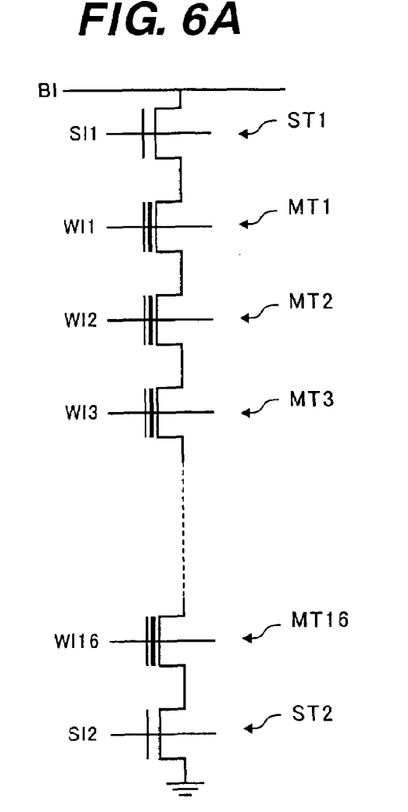
FIGS. 6A to 6C are circuit diagrams and a plan view showing the memory structure in the non-volatile memory area 6.
Figure 6B:
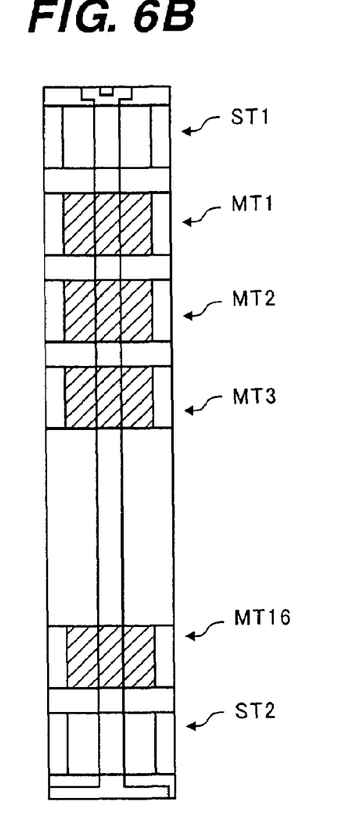

FIG. 6A is a block diagram showing a NAND type memory structure having sixteen memory cells (1-bit memory transistors MT1 to MT16). FIG. 6B is a plan view of the NAND type memory structure shown in FIG. 6A.

In the NAND type memory structure, connected between one bit line contact B1 and ground are: a select transistor ST1 whose gate is connected to a horizontal read control line S11; a select transistor ST2 whose gate is connected to a vertical read control line S12; and sixteen memory transistors MT1 to MT16 each storing one-bit information.

Figure 6C:
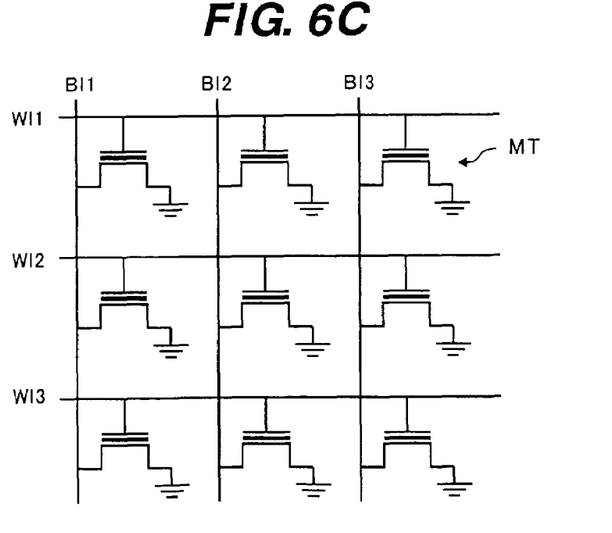

The non-volatile memory may use not only the NAND type memory structure but also a NOR type memory structure in which one transistor is connected to one bit line contact B1 as shown in FIG. 6C.

The memory transistors MT1 to MT16 may be made of floating gate type memory transistors, MONOS type memory transistors or ferroelectric memory transistors.

FIGS. 7A to 7F are cross sectional views and circuit diagrams showing examples of the structure of a non-volatile memory transistor constituting the non-volatile memory area 6.

Figure 7A:
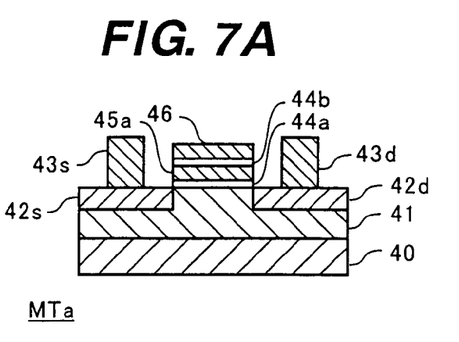
FIGS. 7A to 7F are cross sectional views and circuit diagrams showing examples of the structure of a non-volatile memory transistor constituting the non-volatile memory area 6.
Figure 7B:
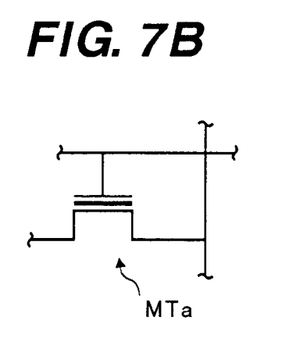

FIG. 7A is a cross sectional view showing the structure of a floating gate type memory transistor MTa, and FIG. 7B is a circuit diagram of the memory transistor MTa.

A p-type well 41 is formed on the surface of a semiconductor substrate 40 of n-type silicon or the like. In the surface layer of the p-type well 41, n-type impurity doped regions 42s and 42d are formed. Electrodes 43s and 43d of polysilicon or the like are formed on the n-type impurity doped regions 42s and 42d, respectively. On an insulating film 44a of SiO2 or the like formed on the channel region between the n-type impurity doped regions 42s and 42d, a floating gate 45a of polysilicon or the like is formed. On an insulating film 44b formed on the floating gate 45a, a word line electrode 46 of polysilicon or the like is formed.

Figure 7C:
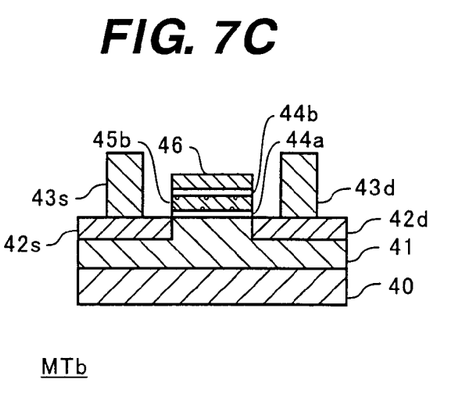
Figure 7D:
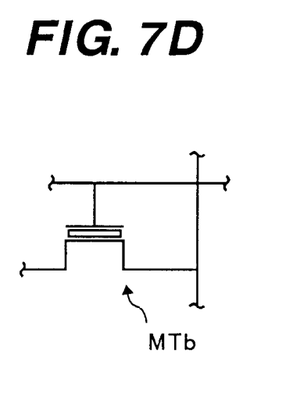

FIG. 7C is a cross sectional view showing the structure of a MONOS type memory transistor MTb, and FIG. 7B is a circuit diagram of the memory transistor MTb.

A p-type well 41 is formed on the surface of a semiconductor substrate 40 of n-type silicon or the like. In the surface layer of the p-type well 41, n-type impurity doped regions 42s and 42d are formed. Electrodes 43s and 43d of polysilicon or the like are formed on the n-type impurity doped regions 42s and 42d, respectively. On the channel region between the n-type impurity doped regions 42s and 42d, a silicon oxide layer 44a, a silicon nitride layer 45b and a silicon oxide layer 44b are stacked. On the silicon oxide layer 44b, a word line electrode 46 of polysilicon or the like is formed. An interface between the silicon oxide layer and silicon nitride layer has a charge accumulation function.

Figure 7E:
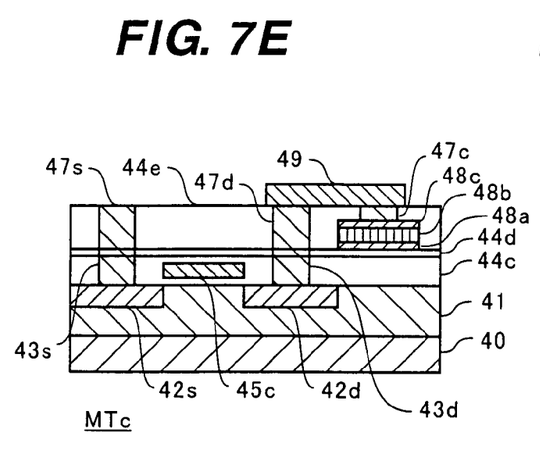
Figure 7F:
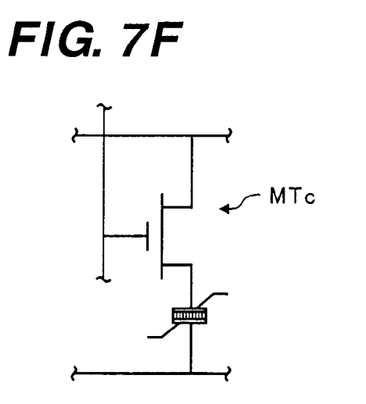

FIG. 7E is a cross sectional view showing the structure of a ferroelectric memory transistor MTc, and FIG. 7B is a circuit diagram of the memory transistor MTc.

A p-type well 41 is formed on the surface of a semiconductor substrate 40 of n-type silicon or the like. In the surface layer of the p-type well 41, n-type impurity doped regions 42s and 42d are formed. On the channel region between the n-type impurity doped regions 42s and 42d, a gate electrode 45c is formed which is then covered with an insulating layer 44c. Openings are formed reaching the impurity doped regions 42s and 42d, and plugs 43s and 43d of tungsten or the like are formed in the openings. A silicon nitride film 44d having an oxygen diffusion preventing function is formed on the insulating film 44c. On the silicon nitride film 44d, a ferroelectric capacitor 48 is formed which is a lamination of a lower electrode 48a of platinum which is resistant against oxidation, a ferroelectric material layer 48b and an upper electrode 48c. An insulating film 44e is formed covering the ferroelectric capacitor 48. Openings are formed in and through the insulating film 44e and through the silicon nitride film 44d to expose the upper surfaces of the conductive plugs 43s and 43d and the upper electrode 48c of the capacitor. Electrodes 47s, 47d and 47c of tungsten or the like are formed in the openings. An electrode 49 of aluminum is formed on the insulating film 44e, connecting the plugs 47d and 47c.

Figure 8:
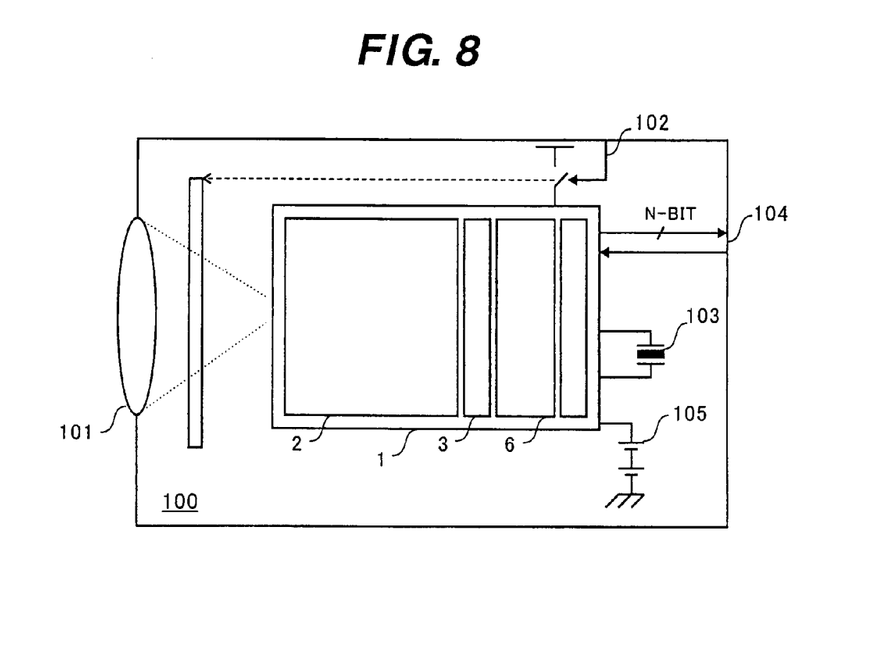
FIG. 8 is a schematic block diagram showing an example of the system structure of a digital camera using a solid state image pickup device of the embodiment.

FIG. 8 is a schematic block diagram showing an example of the structure of a digital camera system using a solid state image pickup device of the embodiment.

A digital camera 100 is constituted of, for example, a solid state image pickup device 1 including a light receiving area 2, a non-volatile memory area 6 and the like, an optical system 101 including a lens and the like, a shutter control unit 102, a crystal oscillator 103, an N-bit digital signal input/output terminal 104, a power source 105 and the like. The shutter control unit 102 is formed of a mechanical shutter and its control circuit in this embodiment; however, the shutter control unit 102 is not limited to the mechanical shutter but may be an electronics shutter wherein the operation of the solid state image pickup device is controlled.

By using the solid state image pickup device 1 of the embodiment, it becomes unnecessary to use HCCD, a high speed analog amplifier, an external high speed A/D converter and the like. Since the solid state image pickup device 1 has the on-chip non-volatile memory area 6, it is not necessary to use an external storage medium. A one-chip digital camera can be realized by omitting a digital signal processing circuit for signal compression and the like and directly reading image raw data. The embodiment can therefore realize a digital camera of ultra low consumption power and low cost.

According to the embodiment of the invention, on the semiconductor substrate of a solid state image pickup device, a non-volatile image area is formed which can record image data of at least one frame. Since image data of all pixels are stored in the non-volatile memory in a non-volatile state, reading data is not required to be real time and it is not necessary to supply electric power to maintain data.

Since data of all pixels is once stored at high speed in a non-volatile memory, influence of dark current and the like is not susceptible and high speed read clocks are not necessary. A CCD type image pickup device of low consumption power and low cost can be realized.

Since data of all pixels is once stored at high speed in a non-volatile memory, an electronic shutter function can be realized for a MOS type solid state image pickup device.

The present invention has been described in connection with the preferred embodiments. The invention is not limited only to the above embodiments. It is apparent that various modifications, improvements, combinations, and the like can be made by those skilled in the art.

What we claim are:

1. A solid state image pickup device comprising:
   a semiconductor substrate defining a two-dimensional surface;
   a number of photoelectric conversion elements disposed in a light receiving area of said semiconductor substrate in a matrix shape and in a first number of rows and a second number of columns;
   analog digital converters, each formed for each column of said photoelectric conversion elements in an area of said semiconductor substrate other than the light receiving area, said analog digital converters converting analog image data from said photoelectric conversion elements into digital image data;
   a non-volatile memory formed in an area of said semiconductor substrate other than the light receiving area at a succeeding stage of said analog digital converters, said non-volatile memory having memory units, each corresponding to one of the photoelectric conversion elements, and recording the digital image data; and
   data register configured between the analog-digital converters and the non-volatile memory, which writes the digital image data to the non-volatile memory, reads out the digital image data stored in the non-volatile memory and horizontally transfers the read-out digital image data.

2. A solid state image pickup device according to claim 1, wherein said non-volatile memory records the digital image data of one frame.

3. A solid state image pickup device according to claim 1, wherein said non-volatile memory records the digital image data of a plurality of frames.

4. A solid state image pickup device according to claim 1, further comprising erasing means for erasing the digital image data after the digital image data stored in said non-volatile memory is read to an external device.

5. A solid state image pickup device according to any one of claims 1-4, wherein addresses of said non-volatile memory in a vertical direction are related to addresses of the light receiving area in the vertical direction.

6. A solid state image pickup device according to claim 1, wherein said non-volatile memory has a depth of same bits as output bits of said analog digital converters provided for each column.

7. A solid state image pickup device according to claim 1, wherein each of said analog digital converters outputs the digital image data of one row of said photoelectric conversion elements in parallel, and said non-volatile memory records the digital image data of one row output parallel at a memory position corresponding to a row direction.

8. A solid state image pickup device according to claim 1, wherein said non-volatile memory is a NAND type transistor memory.

9. A solid state image pickup device according to claim 1, wherein said non-volatile memory is a NOR type transistor memory.

10. A solid state image pickup device according to claim 8, wherein the transistor memory has a floating gate type transistor memory structure.

11. A solid state image pickup device according to claim 8, wherein the transistor memory has a MONOS type transistor memory structure.

12. A solid state image pickup device according to claim 8, wherein the transistor memory is a ferroelectric memory.

13. A solid state image pickup device according to claim 1, further comprising a CCD for reading charges from said photoelectric conversion elements in the light receiving area and transfers analog image data to said analog digital converters provided for each column.

14. A solid state image pickup device according to claim 1, further comprising a MOS circuit for reading charges from said photoelectric conversion elements in the light receiving area and transfers analog image data to said analog digital converters provided for each column, and wiring lines.

15. A solid state image pickup device according to claim 1, further comprising: a shutter control unit; and
an optical system, and
wherein said solid state image pickup device works as a digital camera.

16. A solid state image pickup device according to claim 1, wherein positions of said photoelectric conversion elements are identified by horizontal position and vertical position, and said non-volatile memory units are identified by two dimensional addresses (x, y), x and y corresponding, respectively, to the horizontal and vertical positions of the photoelectric conversion element.

17. A solid state image pickup device according to claim 16, further comprising:
horizontal address decoder which decodes horizontal address of both the photoelectric conversion elements and the non-volatile memory units.

18. A solid state image pickup device according to claim 17, further comprising:
vertical address decoder including a scan circuit which increments the vertical address;
wherein the vertical address decoder selects one of the photoelectric conversion elements rows, to send analog image data thereof to the analog-digital converters, and send converted digital image data to corresponding non-volatile memory units.

* * * * *